(12) United States Patent
Wold (10) Patent No.: US 11,708,043 B2
(45) Date of Patent: Jul. 25, 2023

(54) INFLATOR BRACKET

(71) Applicant: AUTOLIV ASP, INC., Ogden, UT (US)

(72) Inventor: Dana Wold, Farmington Hills, MI (US)

(73) Assignee: Autoliv ASP, Inc., Ogden, UT (US)

(*) Notice: Subject to any disclaimer, the term of this patent is extended or adjusted under 35 U.S.C. 154(b) by 0 days.

(21) Appl. No.: 17/234,984

(22) Filed: Apr. 20, 2021

(65) Prior Publication Data
US 2022/0332272 A1 Oct. 20, 2022

(51) Int. Cl.
*B60R 21/217* (2011.01)
*B60R 21/232* (2011.01)

(52) U.S. Cl.
CPC ........ *B60R 21/2171* (2013.01); *B60R 21/232* (2013.01)

(58) Field of Classification Search
CPC . B60R 21/217; B60R 21/2171; B60R 21/232; B60R 21/2177; B60R 2021/2172; B60R 2021/2173
See application file for complete search history.

(56) References Cited

U.S. PATENT DOCUMENTS

| | | | | |
|---|---|---|---|---|
| 2,753,141 A | * | 7/1956 | Weber | H02G 3/121 248/300 |
| 5,611,563 A | * | 3/1997 | Olson | B60R 21/2171 280/741 |
| 5,752,712 A | * | 5/1998 | Acker | B60R 21/2171 280/732 |
| 5,918,898 A | * | 7/1999 | Wallner | B60R 21/26 280/740 |
| 6,039,341 A | * | 3/2000 | Doxey | B60R 21/2176 280/743.1 |
| 6,168,185 B1 | * | 1/2001 | Ross | B60R 21/2176 280/728.2 |
| 6,227,560 B1 | * | 5/2001 | Volkmann | B60R 21/2171 280/730.2 |
| 6,783,148 B2 | * | 8/2004 | Henderson | B60R 21/217 280/730.2 |
| 6,837,513 B2 | * | 1/2005 | Oka | B60R 21/2176 280/741 |
| 6,976,700 B2 | * | 12/2005 | McCann | B60R 21/2171 280/730.2 |
| 7,090,243 B2 | * | 8/2006 | Igawa | B60R 21/2171 280/740 |

(Continued)

*Primary Examiner* — Paul N Dickson
*Assistant Examiner* — Timothy Wilhelm
(74) *Attorney, Agent, or Firm* — Harness, Dickey & Pierce, P.L.C.

(57) ABSTRACT

An inflator bracket for mounting an inflator of an airbag arrangement to a frame of a vehicle includes a main body portion elongated along a length between a first end and a second end. The main body portion includes a front side for receiving the inflator. The inflator bracket additionally includes first and second mounting portions for attachment to the frame of the vehicle. The inflator bracket further includes an interference portion extending from a rear side of the main body portion for contacting the frame of the vehicle and offsetting at least a portion of the main body portion from the frame. The interference portion has a first end depending from the main body portion and a second end. The second end is a free end. The interference portion is adapted to absorb energy from an impact force.

16 Claims, 7 Drawing Sheets

(56) References Cited

U.S. PATENT DOCUMENTS

| | | | | |
|---|---|---|---|---|
| 7,658,400 B2 * | | 2/2010 | Wipasuramonton | B60R 21/2171 280/730.2 |
| 7,699,340 B2 * | | 4/2010 | Okuhara | B60R 21/2171 280/728.2 |
| 7,703,796 B2 * | | 4/2010 | Manire | B60R 21/2171 280/730.2 |
| 7,703,797 B2 * | | 4/2010 | Wright | B60R 21/2171 280/730.2 |
| 7,758,065 B2 * | | 7/2010 | Weigand | B60R 21/2035 280/728.2 |
| 7,862,078 B2 * | | 1/2011 | Yokota | B60R 21/23138 280/730.2 |
| 8,007,000 B2 * | | 8/2011 | Gammill | B60R 21/232 280/730.2 |
| 8,556,290 B2 * | | 10/2013 | Fischer | B60R 21/262 280/741 |
| 8,613,468 B2 * | | 12/2013 | Maruyama | B60R 21/261 280/730.2 |
| 8,764,050 B2 * | | 7/2014 | Baumgartner | B60R 21/2171 280/730.2 |
| 8,764,051 B2 * | | 7/2014 | Fischer | B60R 21/2171 280/728.2 |
| 8,870,043 B2 * | | 10/2014 | Strole | B60R 11/00 224/482 |
| 8,955,877 B2 * | | 2/2015 | Broussard | B60R 21/2171 280/732 |
| 9,415,738 B2 * | | 8/2016 | Mazzocchi | B60R 21/205 |
| 9,511,736 B2 * | | 12/2016 | Kojima | B60R 21/206 |
| 9,511,737 B2 * | | 12/2016 | Cho | B60R 21/262 |
| 9,796,350 B2 * | | 10/2017 | Kojima | B60R 21/2171 |
| 9,896,053 B2 * | | 2/2018 | Tanabe | B60R 21/217 |
| 10,106,120 B2 * | | 10/2018 | Konaka | B60R 21/2171 |
| 10,196,027 B2 * | | 2/2019 | Gammill | B60R 21/2171 |
| 10,315,604 B2 * | | 6/2019 | Terbu | B60R 21/2171 |
| 10,407,019 B2 * | | 9/2019 | Konaka | B60R 21/2171 |
| 10,632,953 B2 * | | 4/2020 | Shigemura | B60R 21/206 |
| 10,696,263 B2 * | | 6/2020 | Shigemura | B60R 21/231 |
| 10,780,858 B2 * | | 9/2020 | Shigemura | B60R 21/2171 |
| 10,906,498 B2 * | | 2/2021 | Özyürek | B60R 21/26 |
| 2004/0090049 A1 * | | 5/2004 | McCann | B60R 21/2171 280/736 |
| 2008/0084051 A1 * | | 4/2008 | Okuhara | B60R 21/2171 280/728.2 |
| 2008/0088118 A1 * | | 4/2008 | Wipasuramonton | B60R 21/2171 280/728.2 |
| 2009/0039627 A1 * | | 2/2009 | Yokota | B60R 21/261 280/730.2 |
| 2012/0038132 A1 * | | 2/2012 | Rick | B60R 21/217 280/732 |

* cited by examiner

INFLATOR BRACKET

FIELD

The present disclosure generally relates to a bracket for mounting an inflator for an airbag to a frame of a vehicle.

BACKGROUND

This section provides background information related to the present disclosure which is not necessarily prior art.

Inflatable restraint devices in the form of airbags are conventionally used in motor vehicles for passive occupant impact protection. Airbags used for frontal impact protection are generally installed in the vehicle steering wheel for the driver and behind the vehicle instrument panel for other front seat occupants. In addition to frontal impact protection, inflatable restraints are conventionally used for occupant protection from side impacts. For example, side curtain airbags may be mounted along the roof rail of a vehicle and deploy in a downward direction to provide an energy absorbing structure between the head and upper torso of an occupant and the vehicle interior components.

Inflatable restraint systems incorporate an inflator which is typically a pyrotechnic device or a compressed gas device (or a hybrid type). At least one sensor is provided that cooperates with an onboard controller (electronic control unit or ECU) to sense vehicle conditions and provide a signal to deploy the inflatable restraints in response to predetermined conditions. Gas supplied by the inflator quickly inflates the restraint device.

The inflator for a side curtain airbag may be attached to the frame of the vehicle with an inflator bracket. As with other components of the airbag system, the inflator need to be compact, particularly in view of increasingly stringent packaging requirements associated with modern day passenger vehicles. A particularly constrained area of a vehicle is located along the roof rail where side curtain airbags are stowed. There is little space available in the transverse cross-section of the roof rail between the structural metal components of the roof rail and the interior trim. In addition to being suitable for a size restricted area, the inflator bracket should not rattle and should not adversely affect the energy absorbing capabilities of the vehicle that otherwise serve to protect occupants of the vehicle.

One known inflator bracket for a side curtain airbag system is shown and described in commonly assigned U.S. Pat. No. 9,573,550, which is incorporated by reference as if fully set forth herein. The inflator bracket of U.S. Pat. No. 9,573,550 is formed from sheet metal to include a carrier section adapted to engage and support the inflator and a base section with at least one mounting tab having a hole for a fastener. The inflator bracket further includes a shelf between the mounting tab and the carrier section that extends perpendicular to the base section and provides clearance for fastening the threaded fastener to the vehicle.

While known inflator brackets, including the inflator bracket of U.S. Pat. No. 9,573,550, may have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide an inflator bracket for an airbag system of a motor vehicle with increased energy absorbing capability.

In accordance with one particular aspect, the present teachings provide an inflator bracket for mounting an inflator of an airbag arrangement to a frame of a vehicle. The inflator bracket includes a main body portion elongated along a length between a first end and a second end. The main body portion includes a front side for receiving the inflator. The inflator bracket additionally includes first and second mounting portions for attachment to the frame of the vehicle. The inflator bracket further includes an interference portion extending from a rear side of the main body portion for contacting the frame of the vehicle and offsetting at least a portion of the main body portion from the frame. The interference portion has a first end depending from the main body portion and a second end. The second end is a free end. The interference portion is adapted to absorb energy from an impact force.

In accordance with another particular aspect, the present teachings provide a side curtain airbag arrangement for a vehicle. The inflator including an inflator and an inflator bracket. The inflator has a generally cylindrical housing. The inflator bracket receives the inflator and includes a main body portion elongated along a length between a first end and a second end. The inflator bracket further additionally first and second mounting portions for connecting the inflator bracket with the frame of the vehicle. The inflator bracket further includes an interference portion longitudinally between the first and second mounting portions. The interference portion extends from a rear side of the main body portion for contacting the frame of the vehicle and offsetting at least a portion of the main body portion from the frame. The interference portion having a cantilevered shape with a first end extending from the main body portion and a second, free end. The interference portion is adapted to deform for absorbing energy from an impact force.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

Figure 1:
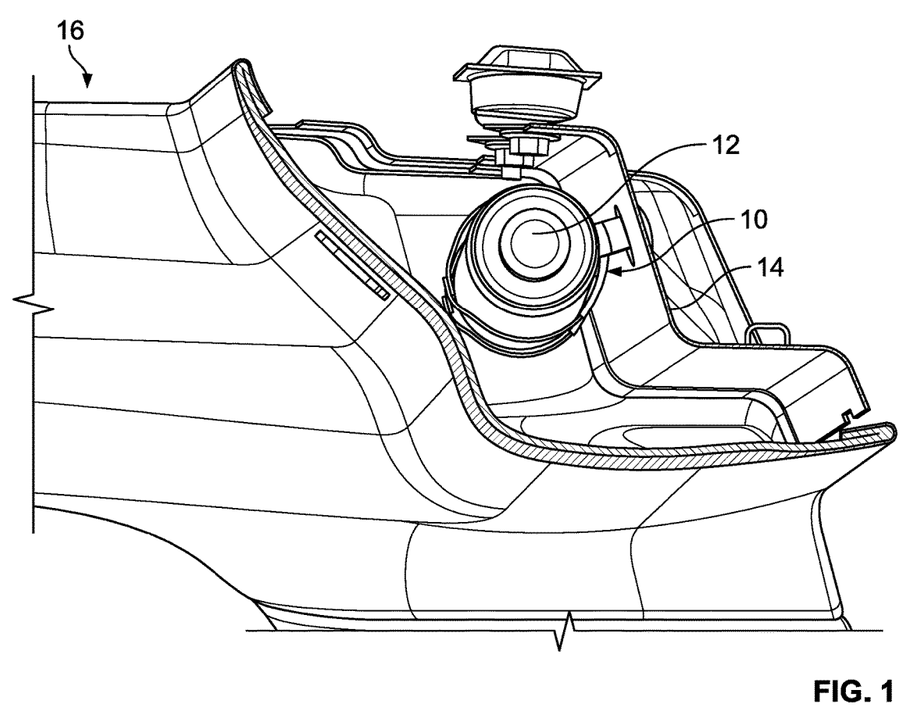
FIG. 1 is a perspective view of a portion of a vehicle shown in partial section and illustrating an inflator bracket in accordance with the present teachings, the inflator bracket shown mounting an inflator of a side curtain airbag to a frame of a vehicle.
Figure 2:
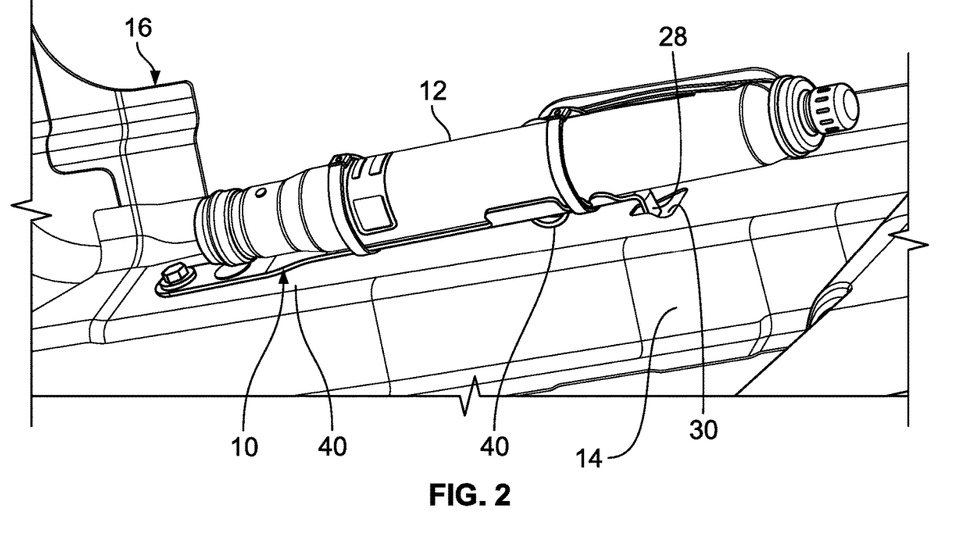
FIG. 2 is another perspective of a portion of a vehicle further illustrating the inflator bracket of FIG. 1, the inflator bracket again shown mounting an inflator of a side curtain airbag to a frame of the vehicle.
Figure 3:
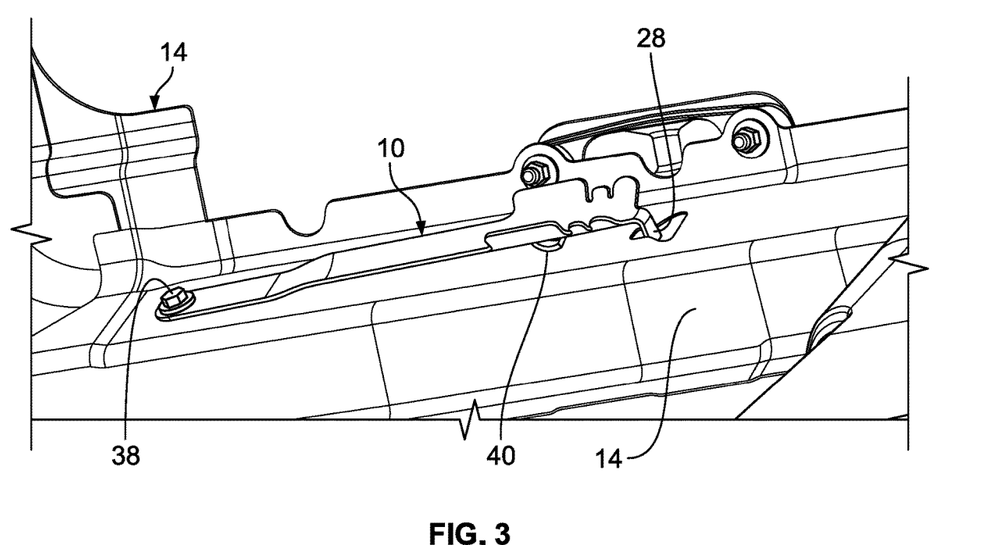
FIG. 3 is a perspective view similar to FIG. 2 with the inflator removed for purposes of illustration.
Figure 4:
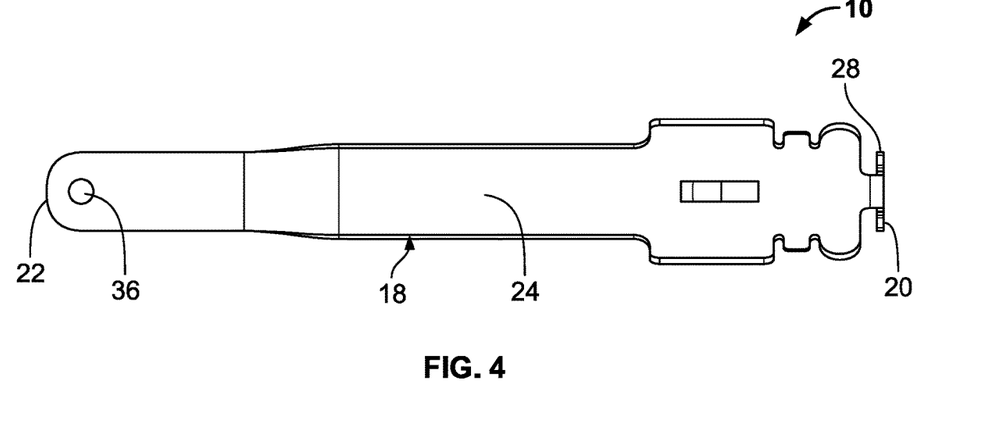
FIG. 4 is a top view of the inflator bracket of the present teachings.
Figure 5:
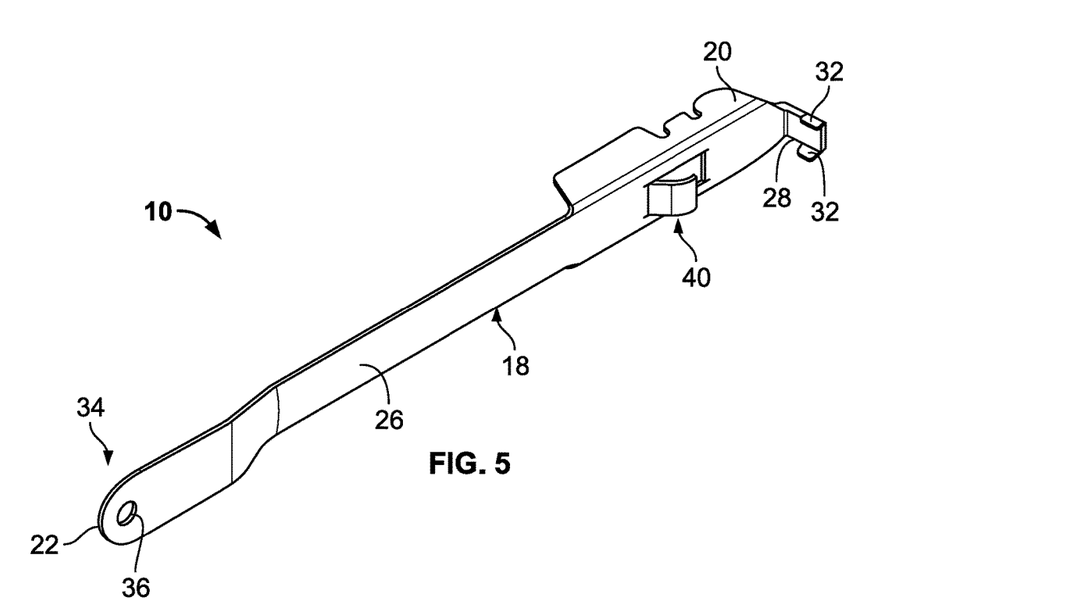
FIG. 5 is a bottom perspective view of the inflator bracket of the present teachings.
Figure 6:
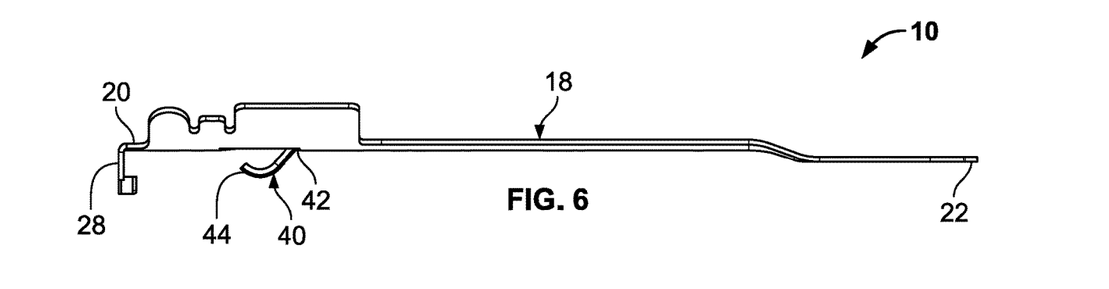
FIG. 6 is a side view of the inflator bracket of the present teachings.
Figure 7:
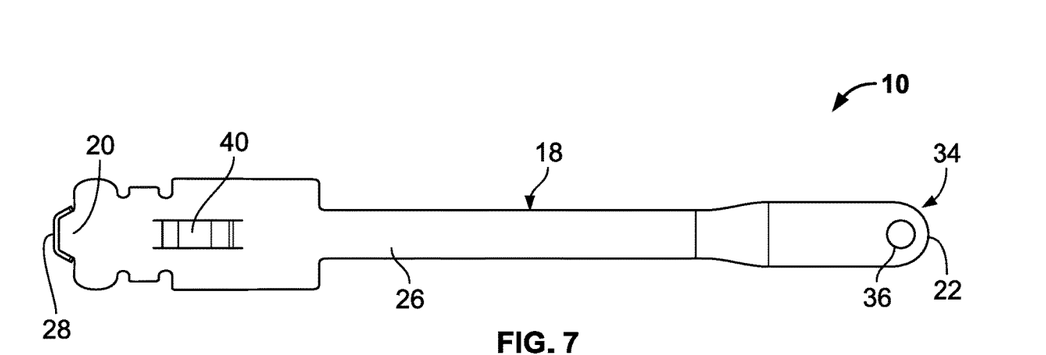
FIG. 7 is a bottom view of the inflator bracket of the present teachings.

With general reference to FIGS. 1 through 7 of the drawings, an inflator bracket in accordance with the present teachings is illustrated and generally identified at reference characters 10. In FIGS. 1 and 2, the inflator bracket 10 is shown mounting an inflator 12 of a curtain side airbag system to a frame 14 of a motor vehicle 16. In FIG. 3, the inflator 12 is removed for purposes of illustration. It will be understood that the particularly use environment shown in drawings is exemplary. In this regard, various aspects of the present teachings may be adapted for other applications.

The inflator bracket 10 is illustrated to generally include a main body portion 18 elongated along a length between a first end 20 and a second end 22 and a width in a direction perpendicular to the length. The length is preferably at least 3 times greater than the width and more preferably at least 4 times greater than the width. The main body portion 18 includes a front side 24 for directly receiving the inflator 12 and an opposite rear side 26 for facing the frame 14 of the vehicle 16.

The inflator bracket 10 may include a first mounting portion 28 at the first end 20 of the main body portion 18 for attachment to the frame 14 of the vehicle 16. In the embodiment illustrated, the first mounting portion is a hook 28 for extending into a hole 30 provided in the frame 14. The hook 28 may extend rearwardly from the rear side 26 in a direction perpendicular to both the length L and the width W. The distal end of the hook 28 may include a pair of tabs 32. It will be understood that the first mounting portion 18 may be alternatively configured within the scope of the present teachings. For example, instead of a hook 28, the first mounting portion may include a feature with a hole or slot that receives a fastener.

The inflator bracket 10 may additionally include a second mounting portion 34 at the second end 22 of the main body portion 18 for attachment to the frame 14 of the vehicle 16. In the embodiment illustrated, the second mounting portion 34 includes a hole 36 that receives a fastener 38. The Fastener, in turn, engages the frame 14 of the vehicle.

The inflator bracket 10 further includes an interference portion 40 extending from the rear side 26 of the main body portion 18 for contacting the frame 14 of the vehicle 16. The interference portion 40 functions to offset at least a portion of the main body portion 18 from the frame 14. The interference portion 40 has a cantilevered shape with a first end 42 depending from the main body portion 18. In this regard, the first end 42 may be directly attached to the main body portion 18 or formed integrally with the main body portion. The interference portion 40 further includes a second, free end 44. In the embodiment illustrated, the interference portion 40 may be arcuate in shape between the first end 42 and the second end 44 and the interference portion may extend toward the first end 20 of the main body portion 18 from the first end 42 to the second end 44. As such, the interference portion 40 includes a curved segment adjacent the free end 44. A lowermost portion of the interference portion 40 has a lower surface that is convexly curved in a direction parallel to the length of the main body portion 18.

At least a portion of the front side 24 of the main body portion 18 may be convexly curved and correspondingly shaped to receive the cylindrical inflator 12.

In the embodiments illustrated, the interference portion 40 extends toward the second end 22 of the main body portion 18 from the first end 42 to the second end 44 and the interference portion 40 linearly extends from the first end 42 to the second end 44. In other applications, the interference portion 40 may extend toward the second end 20 of the main body portion 18 from the first end 42 to the second end 44 and/or the interference portion 40 may be arcuate between the first and second end.

As shown particularly in FIGS. 2 and 3, the interference portion 40 contacts the frame 14 of the vehicle 16 to space the main body portion 18 of the inflator bracket 10 from the frame 14. This contact with the frame 14 prevents rattling of the inflator bracket 10 against the frame. In the event of a side impact collision, for example, the force of an impact may be partially absorbed through deformation of the interference portion. In this manner, the interference portion 40 is adapted to absorb energy from the impact force. The deformation of the interference portion 40 may be elastic, plastic or a combination thereof.

Figure 8:
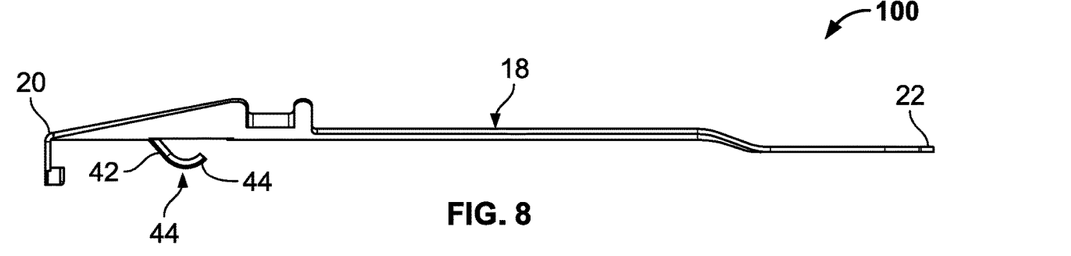
FIG. 8 is a similar to FIG. 6 illustrating another inflator bracket in accordance with the present teachings.

Turning to FIG. 8, another inflator bracket in accordance with the present teachings is illustrated and generally identified at reference character 100. Common reference characters are used to identify common details between the embodiment of FIGS. 1-7 and the embodiment of FIG. 8. The inflator bracket 100 primarily differs from the inflator bracket 10 in that the interference portion 40 extends toward the second end 22 of the main body portion 18 from the first end 42 to the second end 44.

Figure 9:
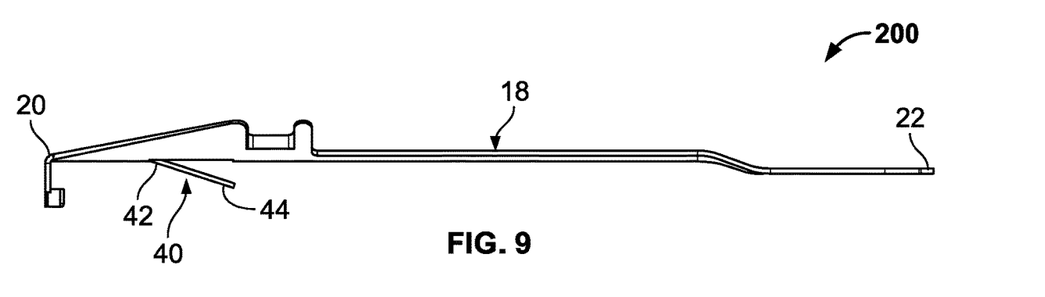
FIG. 9 is another side view similar to FIG. 6 illustrating another inflator bracket in accordance with the present teachings.

Turning to FIG. 9, another inflator bracket in accordance with the present teachings is illustrated and generally identified at reference character 200. Again, common reference characters are used to identify common details between the previously described embodiments and the embodiment of FIG. 9. The inflator bracket 200 primarily differs from the inflator bracket 100 in that the interference portion 40 extends linearly from the first end 42 to the second end 44. In the embodiment illustrated, the interference portion 40 extends toward the second end 22 of the main body portion 18 from the first end 42 to the second end 44. In other applications, the interference portion 40 may extend toward the second end 20 of the main body portion 18 from the first end 42 to the second end 44. In other applications within the scope of the present teachings, the interference portion 40 may extend as a combination of curved and linear surfaces. For example, the interference portion may alternatively extend as segmented surfaces with discrete bends.

Figure 10:
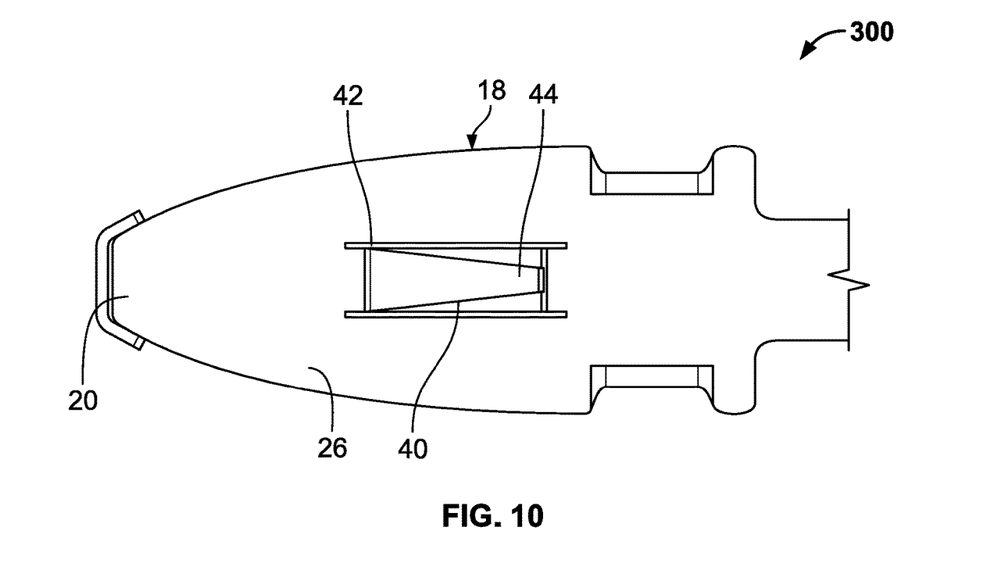
FIG. 10 is a bottom view a portion of another inflator bracket in accordance with the present teachings.

Turning to FIG. 10, another inflator bracket in accordance with the present teachings is illustrated and generally identified at reference character 300. Again, common reference characters are used to identify common details between the previously described embodiments and the embodiment of FIG. 10. The inflator bracket 300 primarily differs from the inflator bracket 100 in that the interference portion 40 tapers as it extends from the first end 42 to the second end 44. The interference portion 40 may continuously taper from a maximum width at the first end 42 to a minimum width at the second end 44. Alternatively within the scope of the present teachings, the taper may not be continuous or may even reverse taper direction at a certain location. Adjusting the width or taper of the interference portion 40 may be used to adjust the spring characteristic of the interference portion 40.

Figure 11:
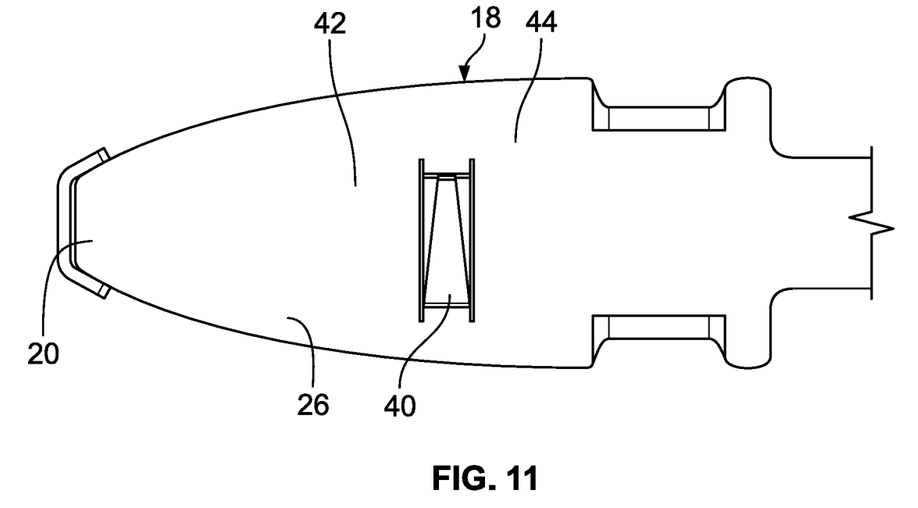
FIG. 11 is a bottom view of a portion of another inflator bracket in accordance with the present teachings.
Figure 12:
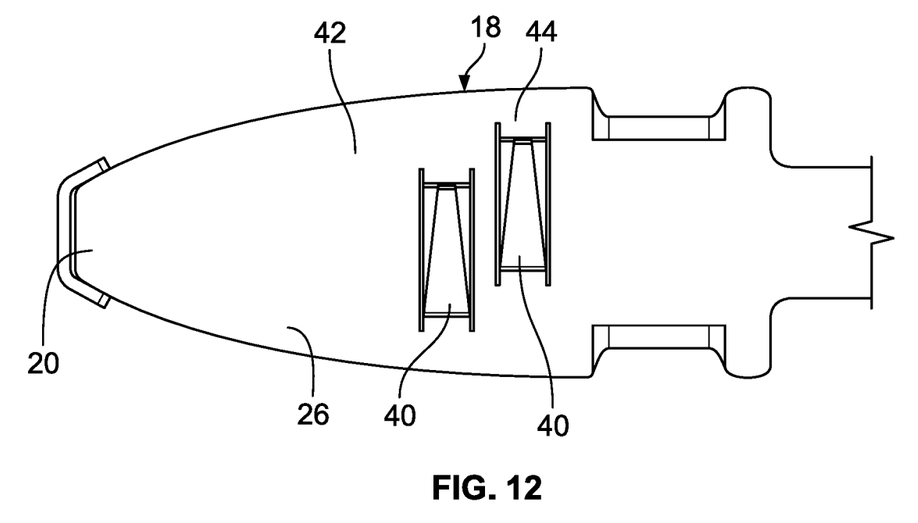
FIG. 12 is a bottom view of a portion of another inflator bracket in accordance with the present teachings.
Figure 13:
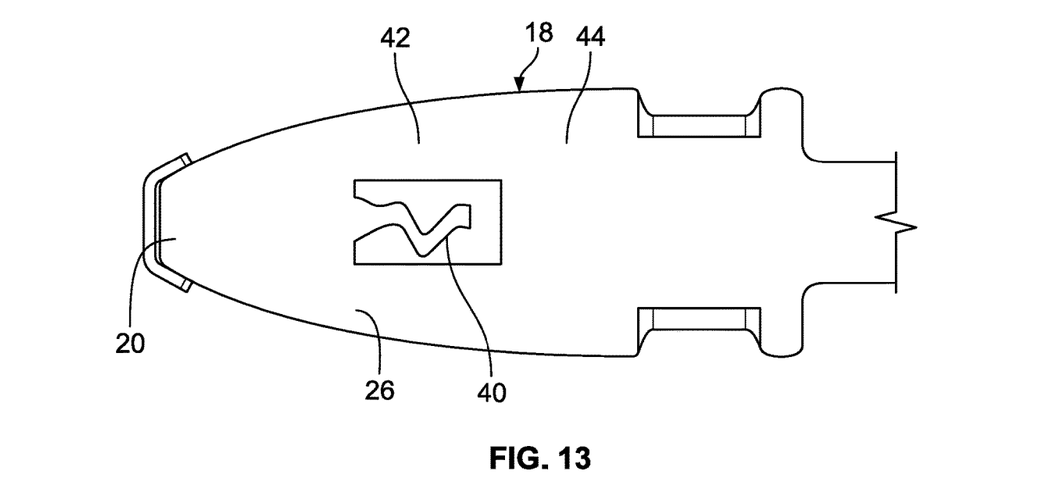
FIG. 13 is a bottom view of a portion of another inflator bracket in accordance with the present teachings.
Figure 14:
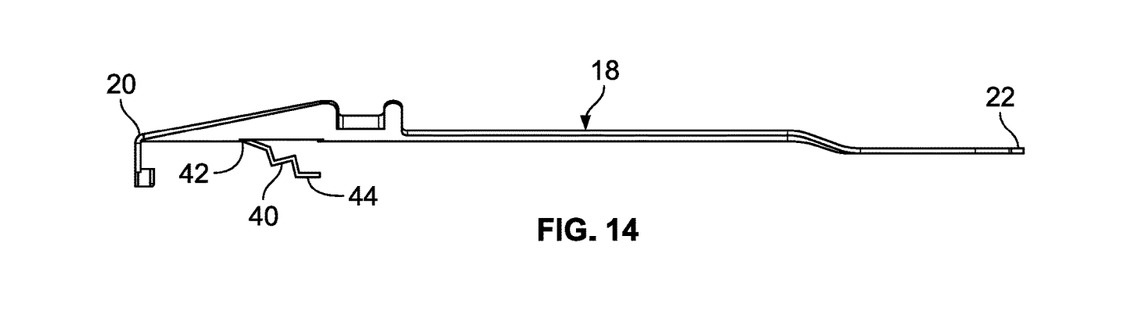
FIG. 14 is a side view of a portion of another inflator bracket in accordance with the present teachings.
Figure 15:
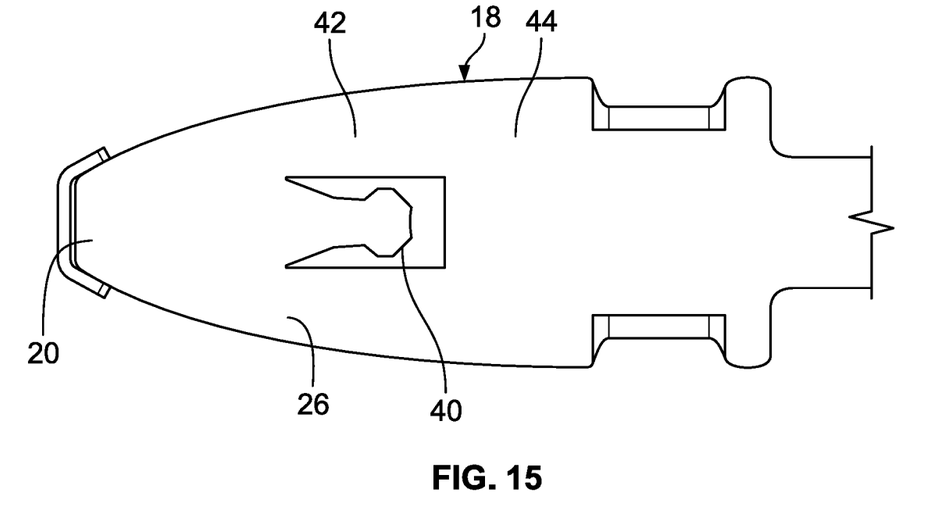
FIG. 15 is a bottom view of a portion of another inflator bracket in accordance with the present teachings.

With reference to FIGS. 11-15, portions of alternative inflator brackets in accordance with the present teachings are illustrated. In FIG. 11, the interference portion 40 is shown to extend in a direction perpendicular to the length of the bracket 10. It will be understood that the interference portion may also extend at other angles not parallel or perpendicular to the length of the bracket 10. In FIG. 12, the bracket 10 includes more than one interference portion 40. In FIG. 13, the interference portion 40 is shown to include an asymmetric shape. In FIG. 14, the interference portion 40 is multi-segmented or stepped. In FIG. 15, the interference portion 40 has a variable width. The interference portion 40 may alternatively include any combination of straight and arcuate segments. Various configuration of the interference portion may be selected to tune the spring rate and/or the amount of plastic vs. elastic deformation.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. An inflator bracket for mounting an inflator of an airbag arrangement to a frame of a vehicle in combination with the frame of the vehicle, the inflator bracket comprising:
   a main body portion elongated along a length between a first end and a second end, the main body portion including a front side for receiving the inflator;
   a first mounting portion for attachment to the frame of the vehicle;
   a second mounting portion for attachment to the frame of the vehicle; and
   an interference portion extending from a rear side of the main body portion, contacting a side of the frame of the vehicle and offsetting at least a portion of the main body portion from the frame, the side of the frame facing the inflator bracket, the interference portion having a first end depending from the main body portion and a second end, the second end being a free end,
   wherein the interference portion is entirely on the adjacent side of the frame, contacts an adjacent side of the frame and absorbs energy from an impact force through deformation of the interference portion.

2. The inflator bracket of claim 1, wherein the first mounting portion is selected from a group consisting of a hook and a hole for a fastener.

3. The inflator bracket of claim 1, wherein the second mounting portion includes a hole for receiving a fastener.

4. The inflator bracket of claim 1, wherein the interference portion is a cantilevered portion.

5. The inflator bracket of claim 1, wherein a lowermost portion of the interference portion has a lower surface that is convexly curved in a direction parallel to the length of the main body portion.

6. The inflator bracket of claim 1, wherein the interference portion linearly extends from the first end to the second end or the interference portion includes a combination of linear and curved portions.

7. The inflator bracket of claim 1, wherein the interference portion includes at least a portion that tapers in width between the first end and the second end.

8. The inflator bracket of claim 1, wherein the interference portion continuously tapers from a maximum width at the first end to a minimum width at the second end.

9. The inflator bracket of claim 1, in combination with the inflator.

10. The inflator bracket of claim 1, wherein deformation of the interference portion is elastic, plastic or a combination thereof.

11. A side curtain airbag arrangement for a vehicle comprising:
    an inflator having a generally cylindrical housing;
    an inflator bracket receiving the inflator, the inflator bracket including a main body portion elongated along a length between a first end and a second end;
    first and second mounting portions for connecting the inflator bracket with a frame of the vehicle;
    an interference portion longitudinally between the first and second mounting portions, the interference portion extending from a rear side of the main body portion, contacting an adjacent side the frame of the vehicle and offsetting at least a portion of the main body portion from the frame, the interference portion having a cantilevered shape with a first end extending from the main body portion and a second end, the second end being a free end, wherein the interference portion is entirely on the adjacent side of the frame, contacts an adjacent side of the frame and absorbs energy from an impact force through deformation of the interference portion.

12. The inflator bracket of claim 11, wherein the first mounting portion includes a hook and the second mounting portion includes a hole for receiving a fastener.

13. The inflator bracket of claim 11, wherein a lowermost portion of the interference portion has a lower surface that is convexly curved in a direction parallel to the length of the main body portion.

14. The inflator bracket of claim 11, wherein the interference portion linearly extends from the first end to the second end.

15. The inflator bracket of claim 11, wherein the interference portion tapers in width between the first end and the second end.

16. The inflator bracket of claim 11, wherein the interference portion continuously tapers from a maximum width at the first end to a minimum width at the second end.

* * * * *